United States Patent
Brecheisen et al.

(10) Patent No.: US 6,648,188 B2
(45) Date of Patent: Nov. 18, 2003

(54) LIQUID DISPENSING PACKAGE AND METHOD OF MANUFACTURE

(75) Inventors: William W. Brecheisen, Findlay, OH (US); John W. Safian, Maumee, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 106 days.

(21) Appl. No.: 09/776,434

(22) Filed: Feb. 2, 2001

(65) Prior Publication Data

US 2002/0056727 A1 May 16, 2002

Related U.S. Application Data (63) Continuation-in-part of application No. 09/468,575, filed on Dec. 21, 1999, now abandoned.

(51) Int. Cl.$^7$ ............................................. B65D 23/06
(52) U.S. Cl. ................. 222/546; 222/571; 215/44; 215/45
(58) Field of Search ............... 215/44, 45, 321; 220/675, 659; 222/546, 551, 571

(56) References Cited

U.S. PATENT DOCUMENTS

| | | |
|---|---|---|
| 29,611 A | 8/1860 | Maurer |
| 242,019 A | 5/1881 | Miller |
| 1,165,787 A | 12/1915 | Lance |
| 1,271,988 A | 7/1918 | Anderson |
| 1,749,253 A | 3/1930 | Levy |
| 2,601,039 A | 6/1952 | Livingstone |
| 2,741,902 A | 4/1956 | Thompson |
| 2,793,790 A | 5/1957 | Kahler |
| 2,889,080 A | 6/1959 | Livingstone |
| 2,975,947 A | 3/1961 | Pellett |
| 3,189,072 A | 6/1965 | Starr |
| 3,208,650 A | 9/1965 | Ham |
| 3,391,838 A | 7/1968 | Gundel |
| 3,592,349 A | 7/1971 | Baugh |
| 3,833,150 A | 9/1974 | Visser-Patings |
| 4,078,700 A | 3/1978 | Hidding |
| 4,133,462 A | 1/1979 | Lindström |
| 4,298,145 A | 11/1981 | Iida |
| 4,387,819 A | 6/1983 | Corsette |
| 4,497,623 A | 2/1985 | Beuscher |
| 4,545,953 A | 10/1985 | Cage et al. |
| 4,566,508 A | 1/1986 | Tomibe et al. |
| 4,640,855 A | 2/1987 | St. Clair |
| 4,699,285 A | 10/1987 | Perne et al. |
| 4,712,699 A | * 12/1987 | Lutz ........................... 215/307 |
| 4,771,904 A | 9/1988 | Perne et al. |
| 4,796,769 A | 1/1989 | Obadia |
| 4,823,967 A | 4/1989 | Thompson |
| 4,863,067 A | 9/1989 | Krall |
| 4,890,768 A | 1/1990 | Robinson |
| 4,892,126 A | 1/1990 | Bucheler et al. |

(List continued on next page.)

Primary Examiner—Kenneth Bomberg (57) ABSTRACT

A container and closure package in that includes a container having a body, a finish wall extending from the body with at least one external thread, a circular throat at an axial edge of the finish wall remote from the body and having a lesser inner diameter than the finish wall, and a pour spout extending axially from the throat at greater inner diameter than the throat. The container body, finish wall, throat and pour spout are of integrally blow molded construction as formed, with the inside diameter of the throat being optionally reamed as required for sealing engagement with the closure. The closure has a base wall, a peripheral outer skirt extending from the base wall with an internal thread for receipt over the external thread on the container finish wall, and an internal skirt extending from the base wall and spaced radially inwardly from the outer skirt for sliding plug-sealing receipt within the throat, with the pour spout being disposed between the inner and outer skirts of the closure.

11 Claims, 10 Drawing Sheets

U.S. PATENT DOCUMENTS

| | | | |
|---|---|---|---|
| 4,915,244 A | * | 4/1990 | Celaschi et al. ............ 215/252 |
| 4,941,815 A | | 7/1990 | Julian |
| 5,020,692 A | | 6/1991 | Darr |
| 5,071,037 A | | 12/1991 | Moore et al. |
| 5,114,659 A | | 5/1992 | Krall |
| 5,215,694 A | | 6/1993 | Bartimes et al. |
| 5,228,596 A | | 7/1993 | McNally |
| 5,330,083 A | | 7/1994 | Bartimes et al. |
| 5,692,628 A | | 12/1997 | Montgomery et al. |
| 5,941,422 A | | 8/1999 | Struble |
| 6,041,953 A | | 3/2000 | Goodall |

* cited by examiner

LIQUID DISPENSING PACKAGE AND METHOD OF MANUFACTURE

This application is a continuation-in-part of application Ser. No. 09/468,575 filed Dec. 21, 1999, now abandoned.

The present invention is directed to a liquid containment and dispensing package, and to a method of manufacturing the same, in which the package container has a pour spout that is blow molded with the container as a single unit.

BACKGROUND AND SUMMARY OF THE INVENTION

U.S. Pat. Nos. 4,917,269, 5,207,356 and 5,941,422 disclose liquid containment and dispensing packages in which the container has a pour spout that extends from the container dispensing opening to facilitate dispensing of the liquid content of the container into a dosage cap/closure. In containers for packages of this type, the pour spout is typically formed either separately from the container and secured as a fitment, as in U.S. Pat. No. 5,941,422, or is formed integrally with the finish of the container in an injection molding operation, as in U.S. Pat. Nos. 4,917,269 and 5,207,356. Forming a separate fitment for securement to the container finish in a post-molding operation undesirably increases the cost of manufacture. Likewise, use of injection molding apparatus to form the container finish and pour spout, followed by extrusion blow molding of the container body, undesirably increases the cost of manufacture by increasing the cost of manufacturing tooling. It has been proposed in the past to form the container body, finish and pour spout in a single blow molding operation (followed by trimming as required), but the results have not been entirely satisfactory.

It is a general object of the present invention, in accordance with one aspect of the invention, to provide a container and closure package, and a method of making the same, in which the container body, finish and pour spout are integrally blow molded in a single operation, and in which the container finish has an internal throat of reduced diameter adapted for sliding plug-sealing engagement with an inner skirt of the closure, while the outer skirt of the closure has an internal thread received over an external thread molded into the container finish. It is another object of the present invention, in accordance with a second aspect of the invention, to provide a container for dispensing liquid product, a method of making such container, and a container and closure package, in which a pour lip is formed on the container spout during the molding and/or trimming operation, for reducing drippage from the pour spout, and/or in which one or more drip ledges extend around the external surface of the pour spout for capturing any liquid that may drip from the edge of the pour spout and feed such liquid back to the inside of the container. It is a further object of the invention, in accordance with a third aspect of the invention, to provide a closure for a container and closure package in which the closure is constructed for enhanced sealing engagement with the container finish.

The present invention embodies several aspects, which may be used separately from or in combination with each other, and different aspects of the invention have a number of alternative preferred embodiments. A container and closure package in accordance with one aspect of the invention includes a container having a body, a finish wall extending from the body with at least one external thread, a circular throat at an axial edge of the finish wall remote from the body and having a lesser inner diameter than the finish wall, and a pour spout extending axially from the throat at greater inner diameter than the throat. The container body, finish wall, throat and pour spout are of integrally blow molded construction as formed, with the inside diameter of the throat being optionally reamed or otherwise trimmed as required for sealing engagement with the closure. The closure has a base wall, a peripheral outer skirt extending from the base wall with an internal thread for receipt over the external thread on the container finish wall, and an internal skirt extending from the base wall and spaced radially inwardly from the outer skirt for sliding plug-sealing receipt within the throat, with the pour spout being disposed between the inner and outer skirts of the closure. The internal skirt may optionally have a circumferentially continuous external bead for interference sliding fit within the container throat to enhance sealing engagement between the internal skirt and the container throat. The pour spout has an angulated upper edge formed by trimming a moil from the spout in the container as molded. A pour lip of increased inside diameter may extend part-way around the upper edge, and may be formed by molding a portion of the spout wall radially outwardly offset from the remainder of the spout and then trimming the spout edge along a plane that intersects this offset portion of the spout wall.

A container for dispensing liquid product in accordance with another aspect of the invention includes a hollow body, a finish wall extending from the body with an external thread, a circular throat at an axial edge of the finish wall remote from the body and having a lesser diameter than the finish wall, and a cylindrical spout extending from the throat coaxially with the throat and the finish wall at a greater inner diameter than the throat. The pour spout terminates in a planar edge at an angle to the axis of the spout to form a pour opening. A planar ledge externally extends around the spout at greater angle than the edge to the axis of the spout so as to be spaced from the edge at one side of the spout and to intersect the edge at an opposing side of the spout. The container body, finish wall, throat, pour spout and ledge are of integrally blow molded construction as formed. Any liquid product that may drip from the pour spout is captured by the planar ledge and fed by gravity back into the container body when the container body is moved to an upright position. In the preferred embodiments, the body includes an integrally formed handle, and the planar ledge is angled to intersect the edge of the pour spout adjacent to the handle.

A closure for a container and closure package in accordance with a further aspect of the present invention includes a base wall having a peripheral outer skirt with an internal thread for receipt over an external thread on a container finish. An inner cylindrical skirt extends from the base wall and is spaced radially inwardly from the outer skirt for sliding plug-sealing receipt within a throat on the container. The inner skirt may have an outer surface with a radial step that is so positioned with respect to the thread on the outer skirt that the thread on the outer skirt engages a thread on the container finish before the step engages the finish throat. The internal skirt may include a circumferentially continuous external bead for interference fit within the container throat for improving the sealing engagement between the inner skirt and the container throat. This bead preferably lies in a plane perpendicular to the central axis of the closure, and preferably is axially positioned to make sliding contact with the container finish during the last half-turn of the closure onto the finish.

In the preferred embodiments of the invention, a pour lip extends around an upper edge of the spout remote from the handle. The pour lip in various embodiments of the invention includes an undercut molded into an outer surface of the spout immediately beneath the edge, a hook-shaped lip that extends radially outwardly from the spout at the edge, and a part-cylindrical wall portion radially outwardly offset from the pour spout. In several preferred embodiments, there are a pair of parallel planar drip ledges externally extending around the spout and axially spaced from each other for enhanced capture of any liquid that may drip from the pour lip.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
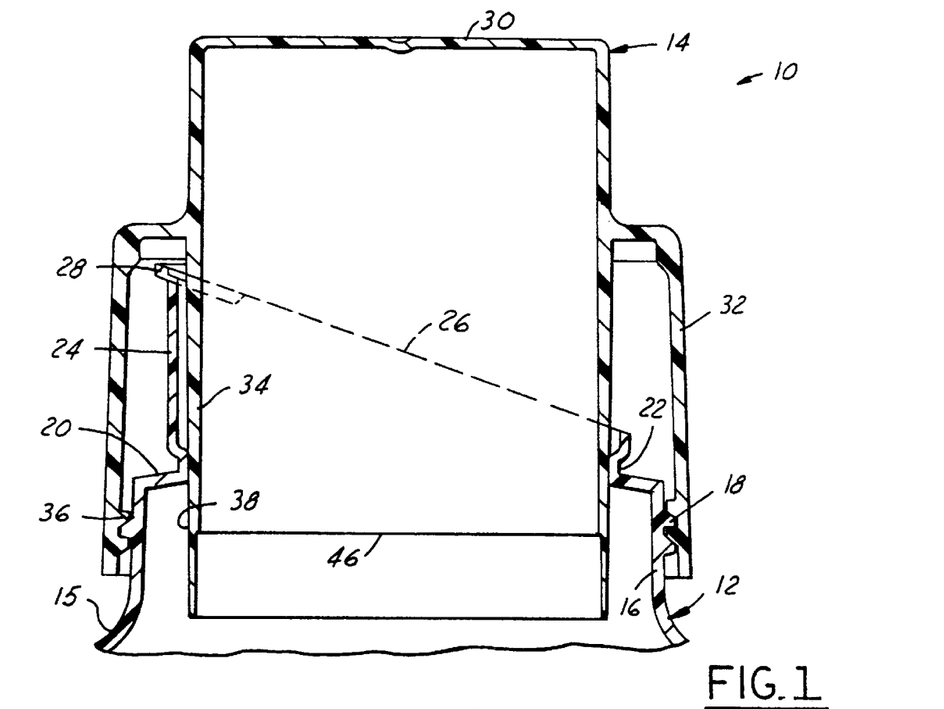
FIG. 1 is a sectioned elevational view diametrically bisecting a container and closure package in accordance with one presently preferred embodiment of the invention.
Figure 2:
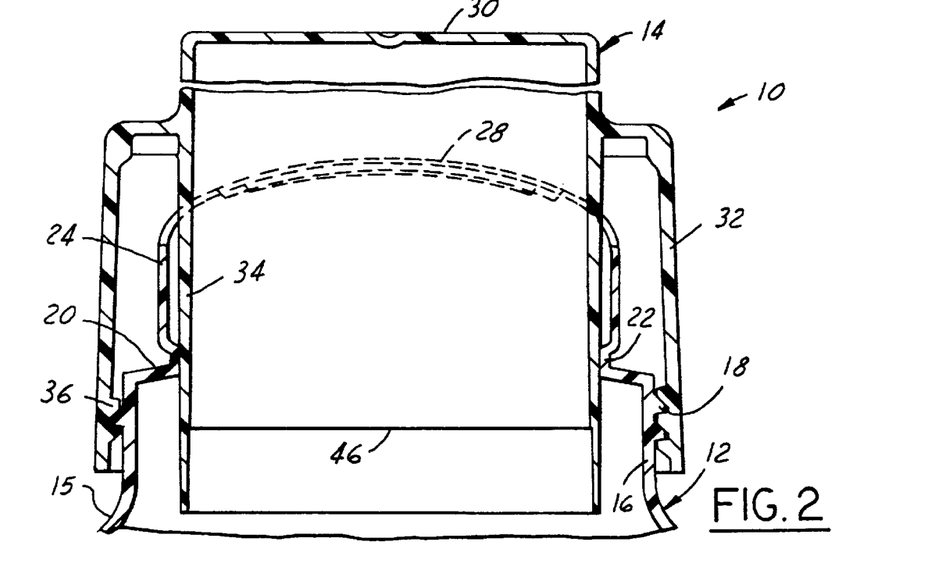
FIG. 2 is a sectional view diametrically bisecting the container and closure package of FIG. 1 at an angle of 90° to that of FIG. 1.

FIGS. 1–2 illustrate a container and closure package 10 in accordance with one presently preferred embodiment of the invention as comprising a container 12 and a closure 14. Container 12 includes a body 15 having a closed bottom and a closed sidewall, and an axially extending finish wall 16 surrounding a dispensing opening. Finish wall 16 is a cylindrical wall with one or more external threads 18 for securing closure 14 to container 12. A wall portion 20 angles radially inwardly and axially outwardly from the axially outer edge of finish wall 16 to a finish throat 22 of restricted diameter. The inside diameter of throat 22, which is preferably cylindrical, is less than the inside diameter of finish wall portion 16. From throat 22, the container finish extends axially and radially outwardly to form an elongated cylindrical pour spout 24 that is concentric with throat 22 but displaced or offset radially outwardly therefrom. The upper edge of spout 24 is trimmed along a plane 26 that is angulated with respect to the central axis of the container finish. At the axial outer edge of spout 26, a pour lip 28 is formed having an arcuate wall that is offset from the cylindrical wall of spout 24. Pour lip 28 preferably extends only part-way around the circumference of spout 24, as best seen in FIG. 2. Closure 14 includes a base wall 30, and integral outer and inner skirts 32, 34. Outer skirt 32 has one or more internal threads 36 for receipt over external thread 18 on finish wall 16, and preferably has a slight outward conical flare. Inner skirt 34 is spaced radially inwardly from outer skirt 32 concentrically with outer skirt 32, and has a cylindrical outer wall surface 38. Base wall 30 is spaced from the upper edge of spout 24 and not in sealing engagement therewith.

Figure 3:
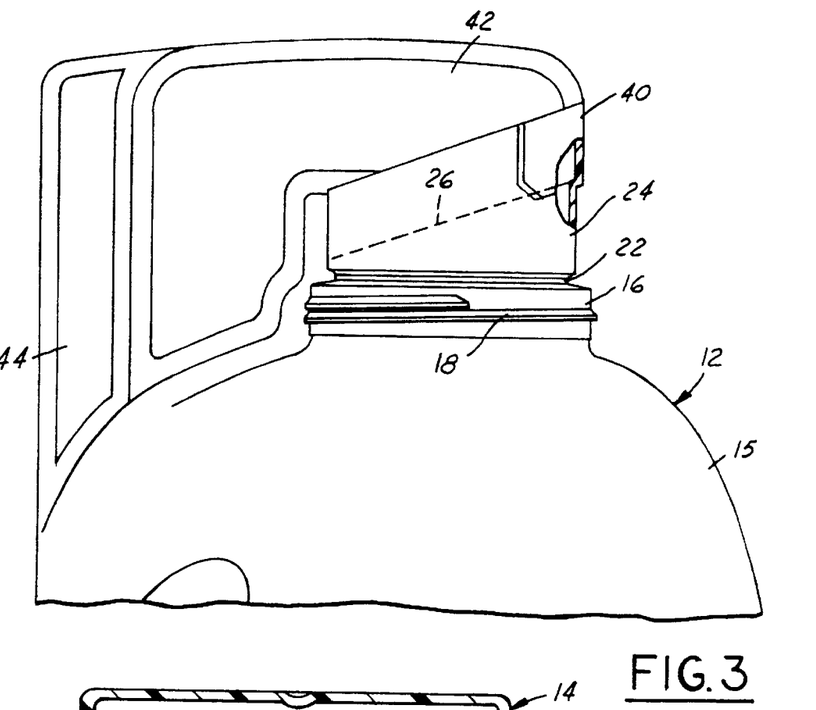
FIG. 3 is a fragmentary elevational view of the container in FIGS. 1 and 2 at an intermediate stage of manufacture.

FIG. 3 illustrates container 12 at an intermediate stage of manufacture. Container 12 is blow molded as a single unit, including spout 24, throat 22, finish wall 16, external thread 18 and body 15. Container 12 is of generally uniform radial wall thickness as formed. Spout 24, throat 22 and finish wall 16 are concentric with each other along the central axis of the container dispensing opening. Spout 24 is molded with a circumferentially limited wall portion 40 that is offset radially outwardly from the main cylindrical wall of the spout. A moil 42 and a flash pocket 44 extend from spout 24, as in conventional in blow molding containers, and must be removed in a post-mold trimming operation. Also in a post-molding operation, spout 24 is trimmed along plane 26 (FIGS. 1 and 3) at an angle to the spout axis to form the upper edge of the spout, and to intersect offset spout wall portion 40 as shown. This intersection with part-cylindrical offset wall portion 40 forms pour lip 28 (FIGS. 1 and 2). Container 12 may be extrusion blow molded of any suitable material and trimmed as described employing otherwise conventional technology. See, for example, U.S. Pat. Nos. 4,523,904 and 5,851,479. The inside diameter of throat 22 may also be reamed or otherwise machined to form an inner sealing surface that is cylindrical and coaxial with the container finish. Closure 14 may be injection molded as illustrated, or compression molded in a suitable conventional manner.

Container 12 is filled by a packager, and closure 14 is then fitted over the container finish. Inner skirt 34 engages the inside diameter of throat 22 in sliding plug-sealing facing engagement with the inside diameter of the throat. The inside diameter of throat 22 may be reamed as described above to enhance this plug-sealing arrangement. Outer skirt 32 is threaded over container finish wall 16. When a consumer desires to dispense product from within container 12, closure 14 is unthreaded from finish wall 16. The container contents are then poured from spout 24, either into the point of use, or into closure 14 within inner skirt 34. Inner skirt 34 may include a mark 46 or other suitable indicia for identifying a specific amount of product, such as one cup of detergent. The measured product may then be poured into the point of use, and the closure returned to the container. As closure skirt 34 is sealingly inserted through container throat, any excess product within the closure automatically drains into the container.

Figure 4:
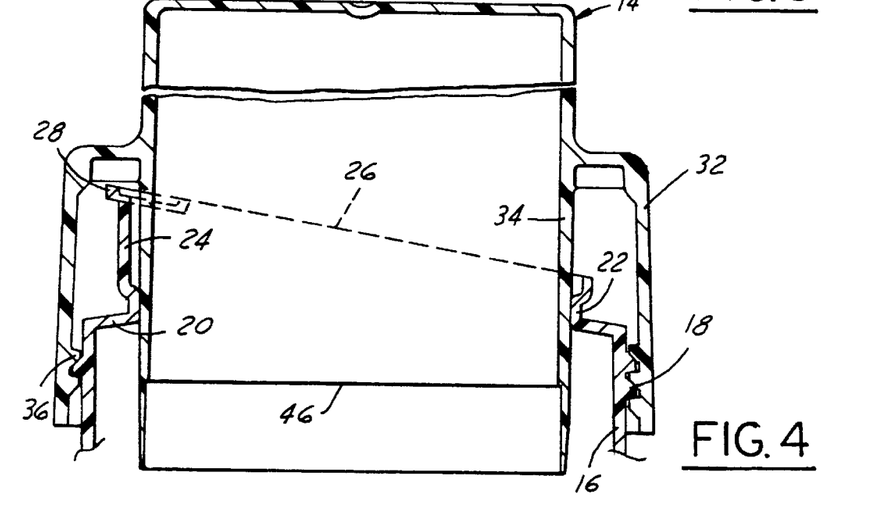
FIG. 4 is a sectioned elevational view similar to that of FIG. 1 but showing a modified embodiment of the invention.

FIG. 4 illustrates a modification to the embodiment of FIGS. 1–3, in which the plane 26 at which container spout 24 is trimmed is at a greater angle to the axis of the container finish—i.e., 80° in FIG. 4 as distinguished from 70° in FIGS. 1–3. The container of FIG. 4 is otherwise identical to that of FIGS. 1–3, and the closure in FIG. 4 is basically the same as that of FIGS. 1–2.

Figure 5:
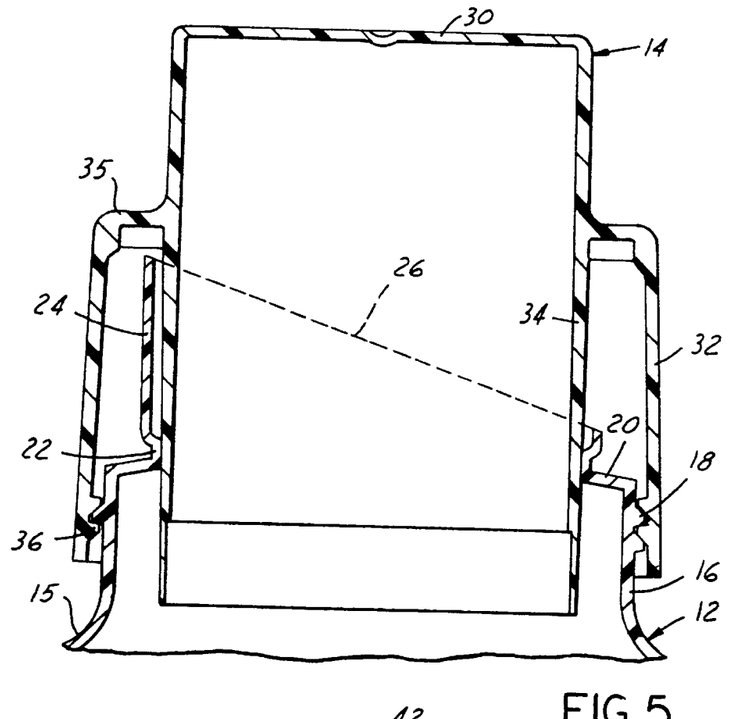
FIG. 5 is a sectioned elevational view similar to those of FIGS. 1 and 4 but showing another embodiment of the invention.
Figure 6:
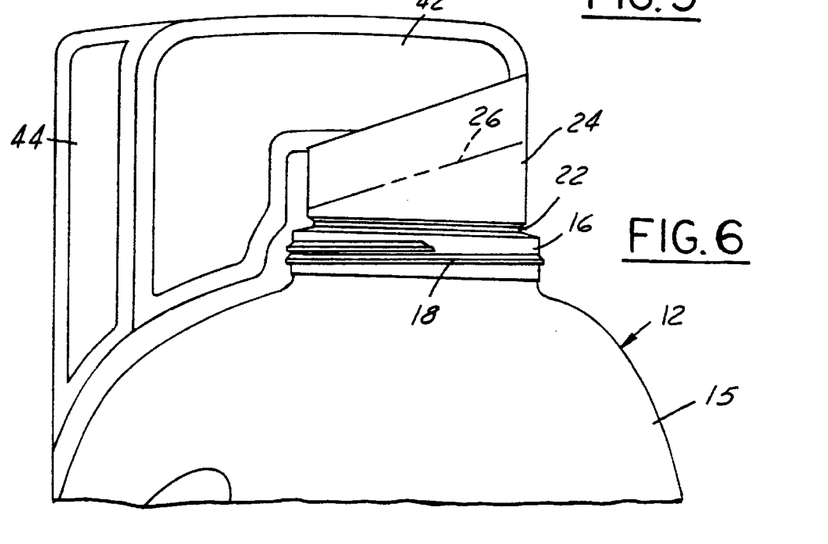
FIG. 6 is a fragmentary elevation view similar to that of FIG. 3 but showing a container in accordance with the embodiment of FIG. 5 at an intermediate stage of manufacture.
Figure 7:
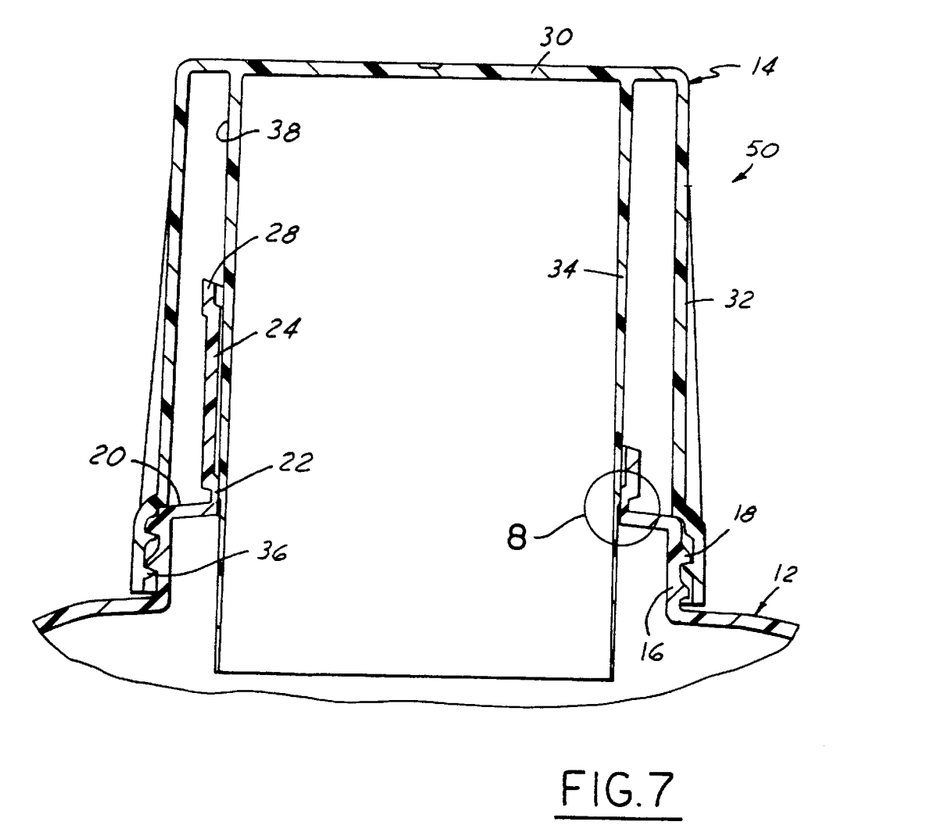
FIG. 7 is a fragmentary sectional view similar to that of FIG. 1 but showing another embodiment of the invention.
Figure 8:
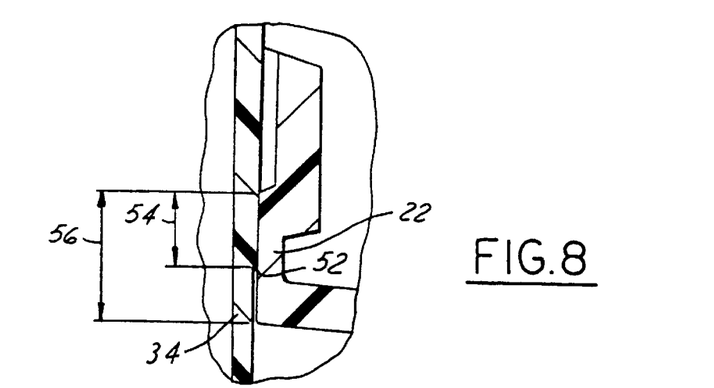
FIG. 8 is an exploded view of the portion of FIG. 7 within the circle 8.
Figure 9:
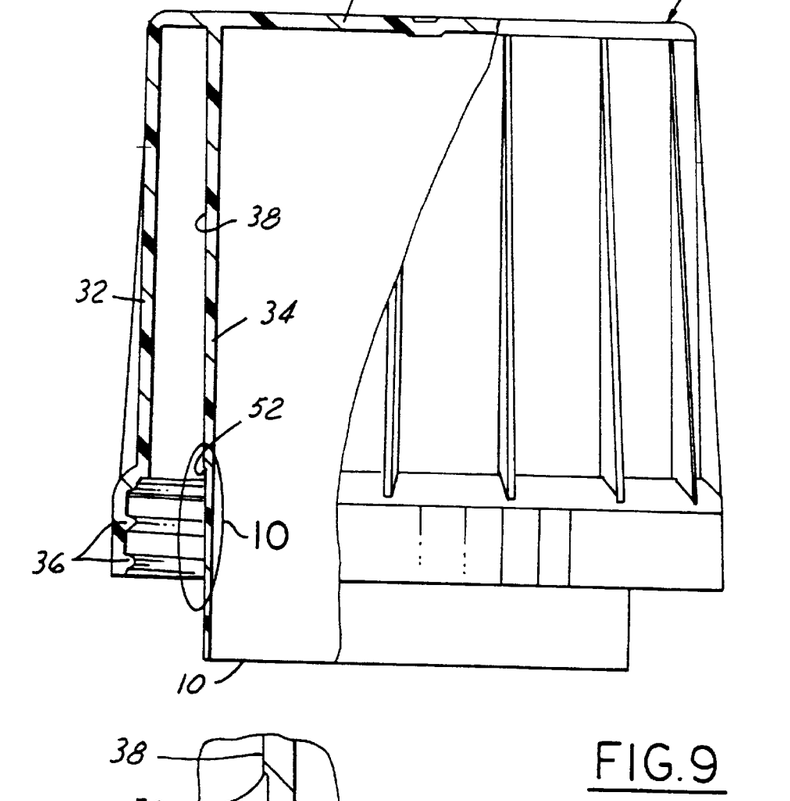
FIG. 9 is a partially sectioned elevational view of the closure in FIG. 7.

FIG. 5 illustrates a modification to the embodiments of FIGS. 1–4, in which pour lip 28 is deleted. In the embodiment of FIG. 5 spout 24 is substantially cylindrical throughout its entire length—i.e., having no pour lip 28 as in the embodiments of FIGS. 1–4. FIG. 6 illustrates the container of FIG. 5 at the intermediate stage of manufacture at which moil 42 and flash pocket 44 are still attached. It will be noted in FIG. 6 that spout 24 is substantially cylindrical throughout its length, having no offset wall portion 40 as in FIG. 3. Otherwise, the container of FIGS. 5–6 is identical to that of FIGS. 1–3.

Figure 10:
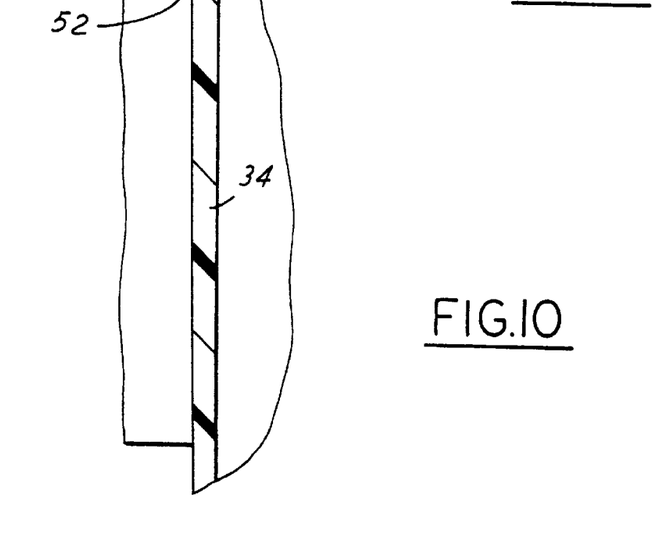
FIG. 10 is a fragmentary sectional view on an enlarged scale of the portion of FIG. 9 within the circle 10.

FIGS. 7–10 illustrate another embodiment 50 in accordance with the invention. In this embodiment, the outer surface 38 of inner skirt 34 includes an annular step 52 extending entirely around skirt 34 in a plane parallel to base wall 30. This step 52 is positioned axially of skirt 34 such that step 52 and surface 38 are not brought into facing sealing engagement with the inside diameter of throat 22 until threads 18, 36 become engaged. In this way, the user obtains the benefit of the mechanical advantage afforded by threads 18, 36 in sealing step 52 against throat 22. Step 52 is preferably conical at an angle of about 45°, as best seen in FIG. 10. The portion 54 of wall surface 38 in sliding sealing engagement with the inside diameter of throat 22 is preferably about one-half of the overall length 56 of throat 22. When surface 38 has an overall diameter of 1.884 inches, step 52 may have a radial dimension of 0.005 inch.

Figures 11, 12:
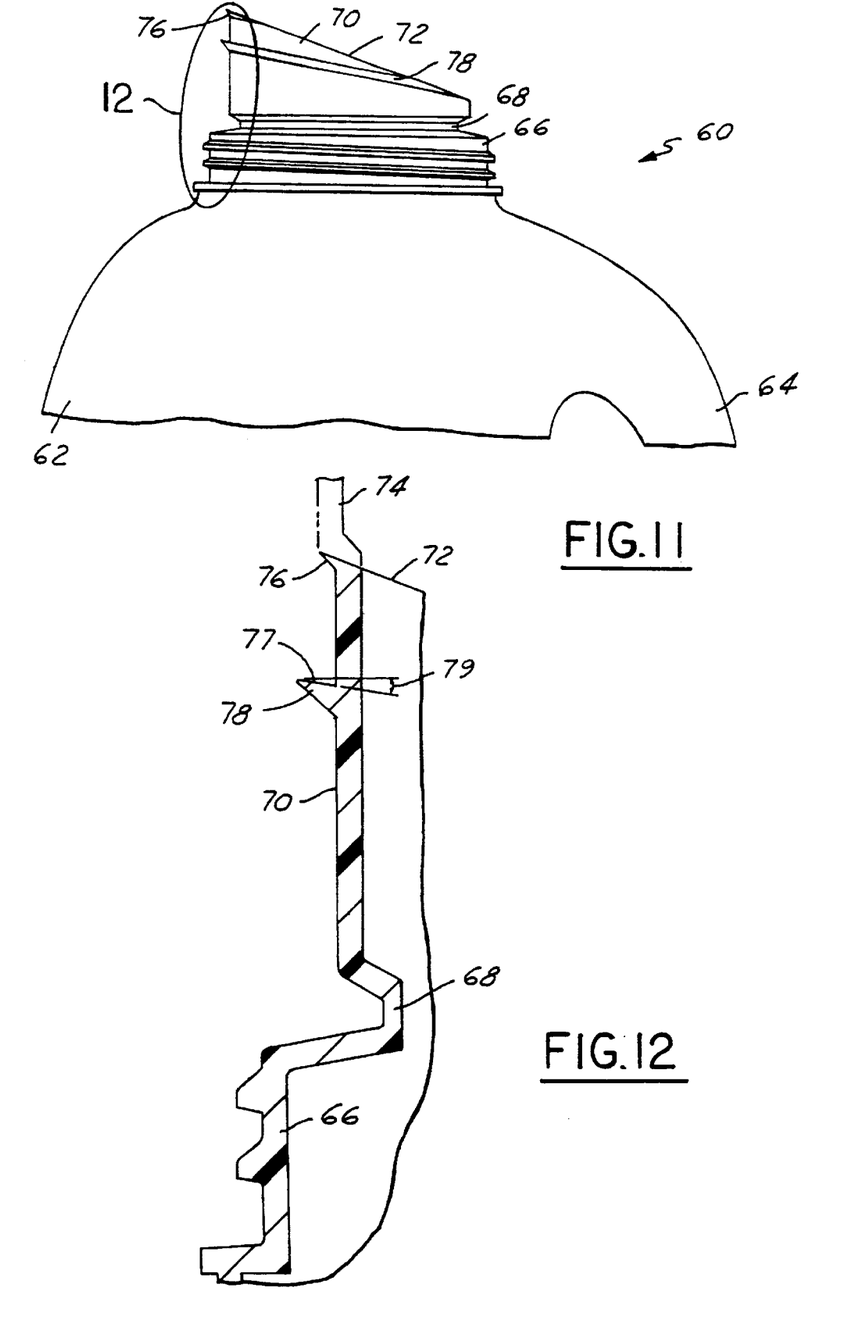
FIG. 11 is a fragmentary side elevational view of a container in accordance with another embodiment of the invention.
FIG. 12 is a fragmentary sectional view on an enlarged scale of the portion of FIG. 11 within the area 12.

FIGS. 11 and 12 illustrate a container 60 in accordance with another aspect of the present invention, including a container body 62 with integral handle 64, externally threaded finish 66, circular throat 68 and cylindrical pour spout 70. Spout 70 is trimmed along a planar edge 72 at an angle, preferably 70°, to the axis of the pour spout. As molded, there is a radial offset 74 (FIG. 12) in pour spout 70, and trim plane 72 is positioned to intersect the shoulder of offset 74 so as to form a sharp wedge-shaped pour lip 76 that extends part-way around the pour spout at the upper edge thereof remote from handle 64. As in prior embodiments, offset 74 extends only part-way around cylindrical pour spout 70. A planar ledge 78 externally extends around pour spout 70 at greater angle to the axis of the pour spout than trim edge 72. Ledge 76 is spaced from edge 72 beneath pour lip 76, and intersects edge 72 at the rear edge of spout 70 (as best seen in FIG. 11) adjacent to handle 64. Pour lip 76 helps prevent drippage of liquid along the external surface of spout 70 when pouring is arrested by return of container 60 to the vertical orientation illustrated in FIG. 11. Any drippage that may occur past pour lip 76, which runs along the external surface of spout 70, is captured by ledge 78 and fed by gravity (assuming upward orientation of the container) along ledge 78 to the back edge of spout 70 adjacent to handle 64, where the liquid is returned through the container finish to the container body. Drip ledge 78 is preferably at an angle of 80° to the container axis. The upper surface 77 of drip ledge 78 is at a small angle, preferably on the order of 3°, with respect to a plane perpendicular to the spout axis. This angle promotes capture of any liquid that may drip past pour lip 76. Ledge 78 is molded into the container spout by means of a recess in the blow mold into which the material of ledge 78 is pushed during the molding operation. There may be a slight indent at the internal.

Figure 13:
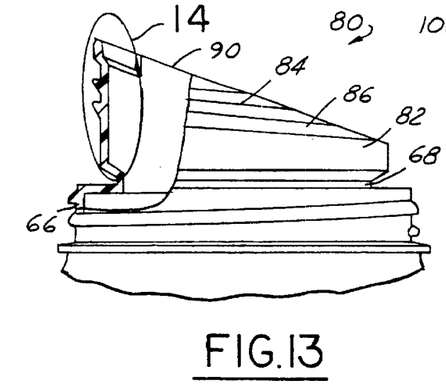
FIG. 13 is a fragmentary elevational view of a container in accordance with yet another embodiment of the invention.
Figure 14:
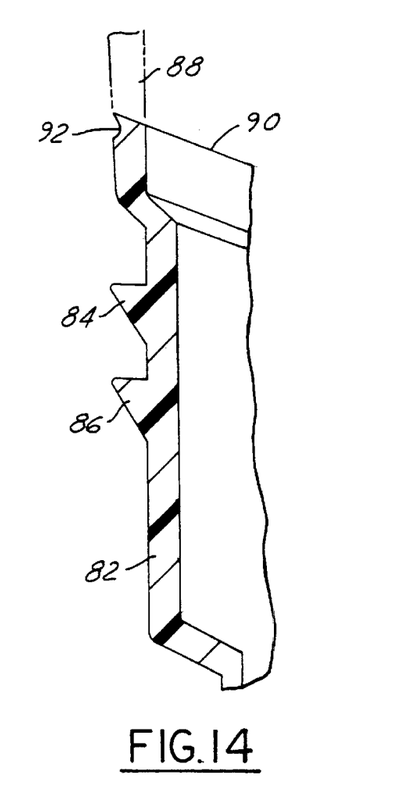
FIG. 14 is a fragmentary sectional view on an enlarged scale of the portion of FIG. 13 within the area 14.
Figure 22:
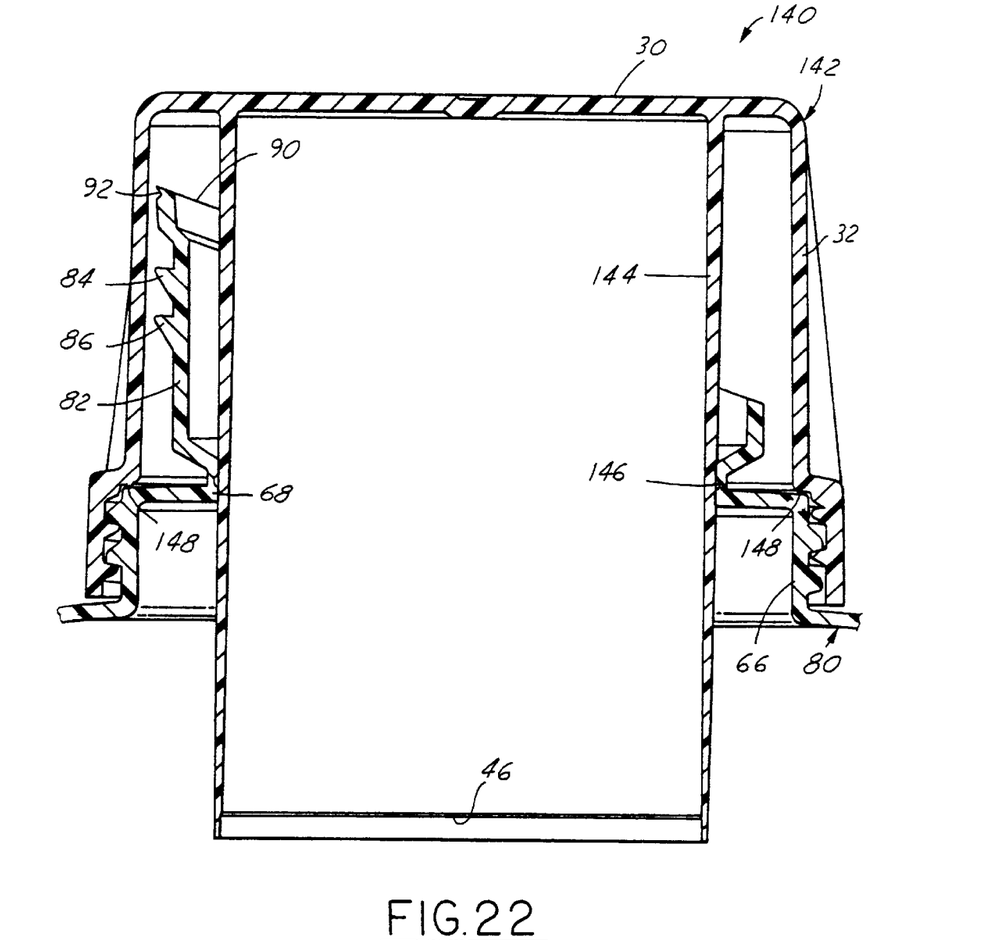
FIG. 22 is a sectioned elevational view diametrically bisecting a container and closure package employing the container illustrated in FIGS. 13 and 14.

FIGS. 13, 14 and 22 illustrate a container 80 in accordance with a modified embodiment of the invention. Container 80 has a cylindrical spout 82 with a pair of axially offset parallel drip ledges 84, 86. Ledges 84, 86 are each identical to ledge 78 in FIGS. 11 and 12. A radially offset wall portion 88 is integrally molded part-way around spout 82 at a position remote from the handle of the container body, and the spout is trimmed along the plane 90 as in prior embodiments. An undercut 92 is molded into the outer surface of offset 88, and trim plane 90 is positioned to intersect the upper edge of undercut 92, and thereby form a sharp pour lip partway around the edge of spout 82 remote from the container handle. Once again, any liquid that may drip past the pour lip will be captured by drip ledges 84, 86 and returned to the container body. FIG. 22 illustrates a package 140 that includes container 80 and a modified closure 142. Closure 142 has a base wall 30 and an external skirt 32 with internal thread for securement to the container finish as previously described. An internal skirt 144 depends from base wall 30 radially inwardly of outer skirt 132 for plug-sealing engagement with throat 68. To enhance such sealing engagement, an external bead 146 is provided on the radially outwardly facing surface of inner skirt 144 for sliding abutting engagement with the inner surface of throat 68. Bead 146 is so positioned on skirt 144 as to contact throat 68 during the last half-turn of the container thread. Such interference fit enhances sealing engagement between the skirt and the container throat. Such interference may be on the order of 0.01 inches entirely around bead 146. Bead has a rounded outer surface, is circumferentially continuous, and lies in a plane perpendicular to the central axis of the closure. A circumferentially continuous rib 148 extends downwardly from a shoulder on outer skirt 32 for abutment sealing engagement with an opposing shoulder on container finish 66 to provide secondary or back-up sealing between the closure and the container finish. It will be recognized that provision of bead 146 and/or rib 148 is not limited to the container embodiment of FIGS. 13, 14 and 22, but may be readily employed in conjunction with the containers in other embodiments of the invention.

Figure 15:
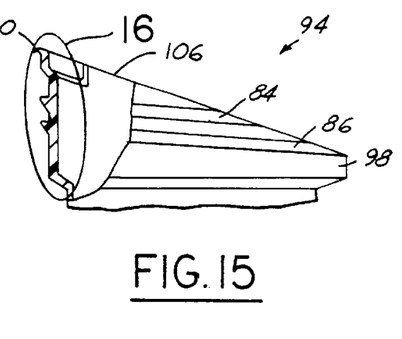
FIG. 15 is a fragmentary elevational view of a container in accordance with a further embodiment of the invention.
Figure 16:
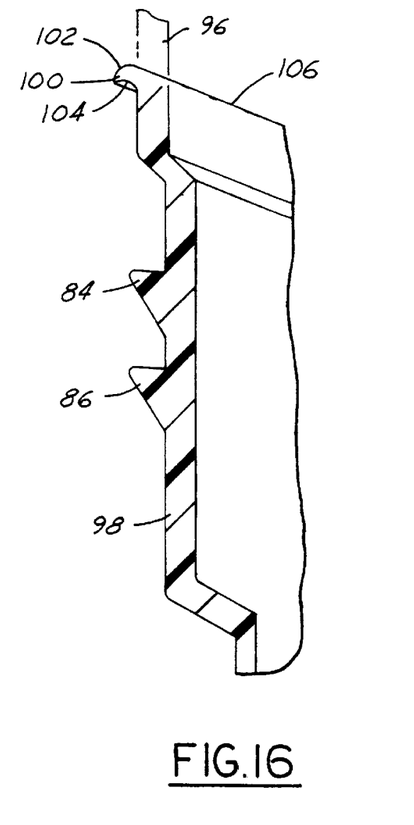
FIG. 16 is a fragmentary sectional view on an enlarged scale of the portion of FIG. 15 within the area 16.

FIGS. 15 and 16 illustrate a container 94, again having an offset portion 96 molded into pour spout 98 so as to extend part-way around the pour spout. A hook-shaped pour lip 100 is molded into the outer surface of spout 98. Hook-shaped pour lip 100 has a convex upper surface 102 that extends radially outwardly and then axially downwardly with respect to spout offset portion 96, and a concave lower surface 104 that meets surface 102 in a sharp downwardly angled edge spaced radially outwardly from offset spout portion 96. Trim plane 106 is positioned to intersect the upper edge of convex surface portion 102—i.e., where surface portion 102 intersects the cylindrical outer surface of offset 96—so as to form the hook-shaped pour lip 100 as previously described. Pour lip 100 is formed on the container spout during the blow molding operation, and there may be a slight indent on the inner surface of the spout radially inboard of the pour lip.

Figure 17:
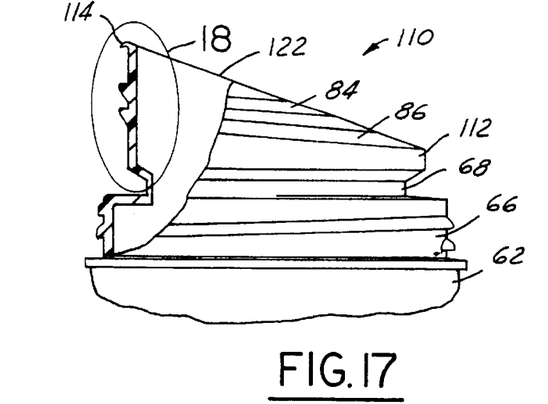
FIG. 17 is a fragmentary partially sectioned elevational view of a container in accordance with yet another embodiment of the invention.
Figure 18:
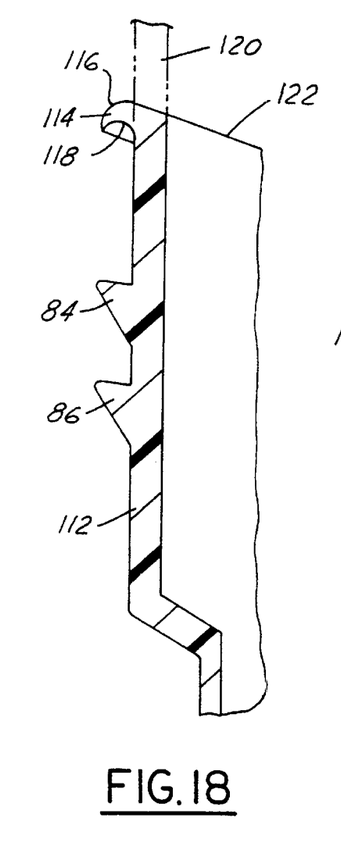
FIG. 18 is a fragmentary sectional view of the portion of FIG. 17 within the area 18.
Figure 19:
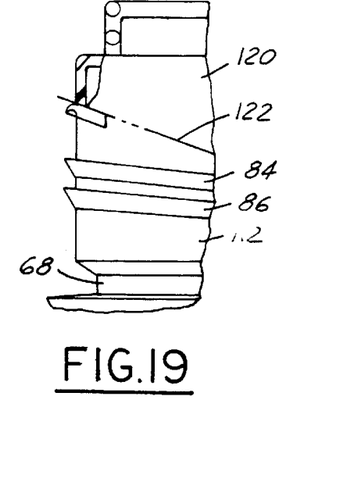
FIG. 19 is a partially sectioned fragmentary elevational view of the container of FIGS. 17 and 18 as molded and illustrating the pour spout trim line.
Figure 20:
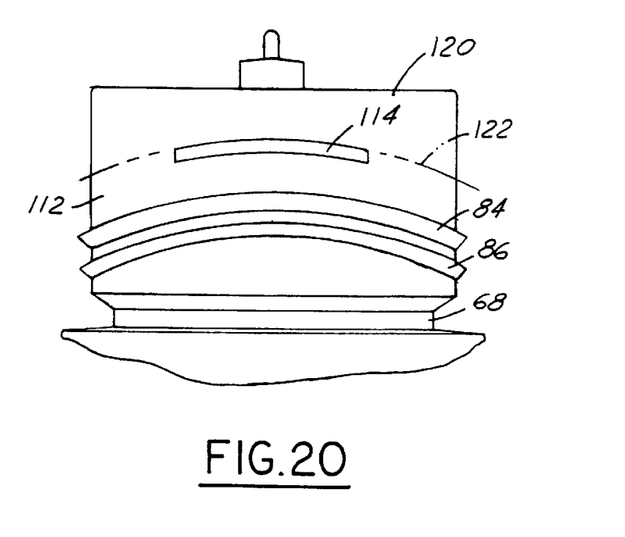
FIG. 20 is a front elevational view of the as-molded container illustrated in FIG. 19.

FIGS. 17 and 18 illustrate a container 110 in accordance with another embodiment of the invention. The portion of container spout 112 at which pour lip 114 is formed is not radially outwardly offset from the main portion of spout 112, as in prior embodiments. Hook-shaped pour lip 114 has an upper convex surface 116 and a lower concave surface 118 that meet in a sharp downwardly oriented pour edge. Pour lip 114, along with drip ledges 84, 86, is molded into spout 112 during the blow molding operation. During this blow molding operation, a moil 120 (FIGS. 19 and 20) extends upwardly from spout 112, and is trimmed from the spout along the trim plane 122. Trim plane 122 is positioned to intersect the upper edge of pour lip 114 in the container as molded so as to intersect the upper edge of pour lip surface 116. Trim plane 122 is at a preferred angle of 70° to the spout axis, as in the prior embodiments.

Figure 21:
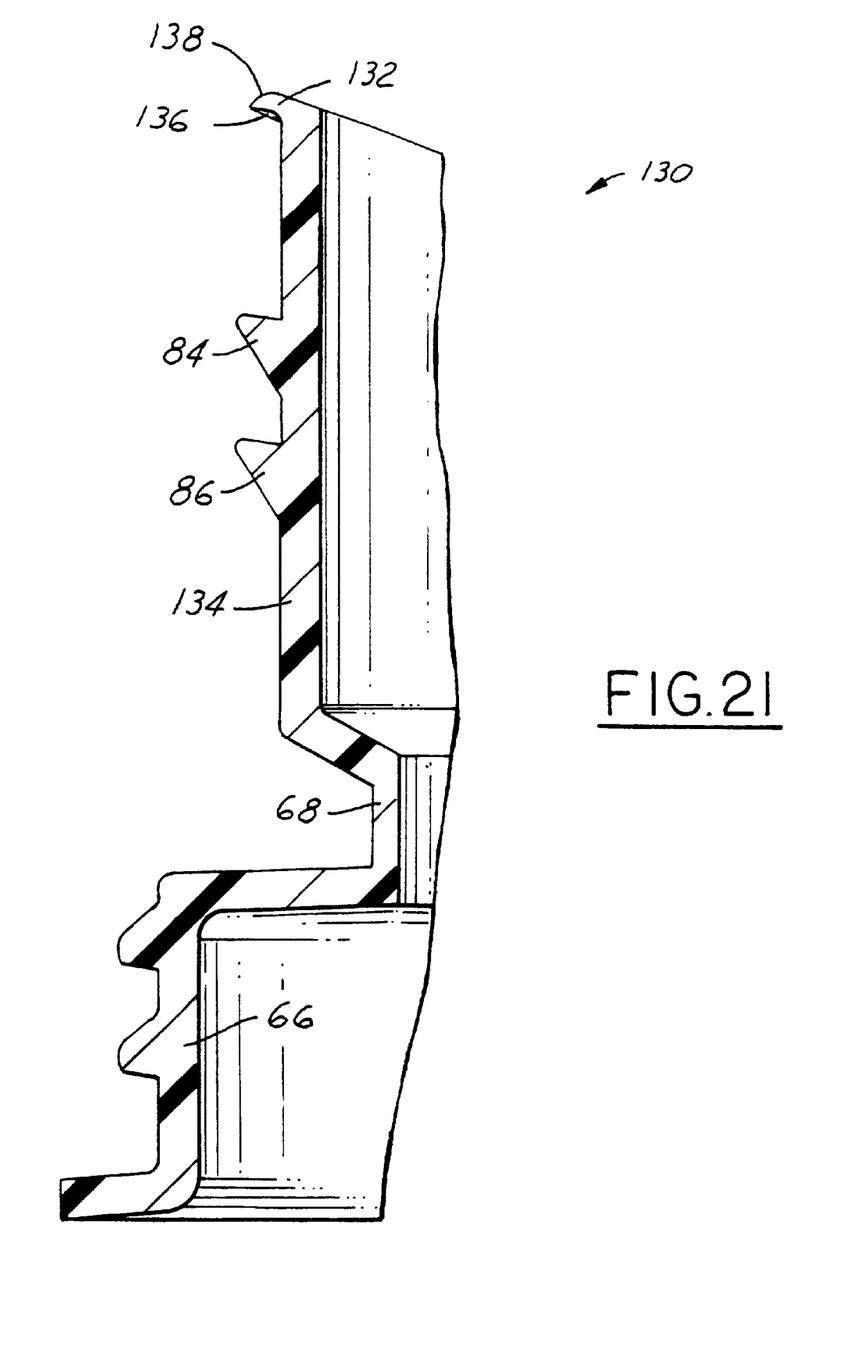
FIG. 21 is a fragmentary sectional view on an enlarged scale that illustrates yet another embodiment of the present invention.

FIG. 21 illustrates a modification to the embodiment of FIGS. 17–18, in which container 130 has a shallower hook-shaped pour lip 132 at the upper edge of spout 134. The lower surface 136 of lip 132 is concave, as in prior embodiments, but does not close past a plane perpendicular to the spout axis. In a preferred embodiment, lower surface 136 is at an angle of 5° to such plane. Pour lip upper surface 138 is convex, as in prior embodiments.

There have thus been disclosed a container for dispensing liquid products, a container and closure package, a closure, a method of making a container, and a method of making a container and closure package, that fully satisfy all of the objects and aims previously set forth. One aspect of the invention contemplates provision of a container for dispensing liquid products. Other aspects of the invention contemplate provision of a container and closure package having various features that may be implemented separately from or more preferably in combination with each other. Yet another aspect of the invention contemplates provision of a closure for such a container and closure package. Several embodiments and modifications have been disclosed. Other modifications will readily suggest themselves to persons of ordinary skill in the art in view of the foregoing description. The invention is intended to embrace all such modifications and variations as fall within the spirit and broad scope of the appended claims.

We claim:

1. A container and closure package that comprises:
    a container having a body with a side handle, a finish wall extending from said body with an external thread, a circular throat at an axial edge of said finish wall remote from said body and having a lesser inner diameter than said finish wall, an elongated cylindrical pour spout extending axially from said throat at greater inner diameter than said throat and having a planar upper edge that is non-perpendicular to the axis of said spout, and a pour lip extending around an upper edge of said spout on a side of said spout remote from said handle, said pour lip comprising a part-cylindrical wall portion radially outwardly offset from said cylindrical pour spout, said container body with handle, finish wall, throat, pour spout and pour lip being of integrally blow molded construction as formed, and
    a closure having a base wall, a peripheral outer skirt extending from said base wall and having an internal thread secured over said external thread on said finish wall, and an inner cylindrical skirt extending from said base wall and spaced radially inwardly from said outer skirt in sliding plug-sealing receipt within said throat with said pour spout being disposed between said inner and outer skirts of said closure, said base wall being free of sealing contact with said upper edge of said pour spout.

2. The package set forth in claim 1 wherein said inner diameter of said throat is machined on a cylinder of revolution concentric with said finish wall.

3. The package set forth in claim 1 wherein said inner skirt has an outer surface with a radial step that is so positioned with respect to said thread on said outer skirt that said thread on said outer skirt engages said thread on said finish before said step engages said throat.

4. The package set forth in claim 1 wherein said inner skirt has an outer surface with a radially outwardly extending bead for interference plug-sealing engagement with said throat.

5. The package set forth in claim 1 further comprising a planar ledge externally extending around said pour spout at a greater angle to said axis than said edge so as to be spaced from said edge at one side of said spout and to intersect said edge at an opposing side of said spout.

6. The package set forth in claim 5 comprising a pair of said planar ledges externally extending around said spout and axially spaced from each other.

7. The package set forth in claim 6 wherein said pair of ledges are parallel to each other.

8. A container that comprises:
    a body with a side handle, a finish wall extending from said body with an external thread, a circular throat at an axial edge of said finish wall remote from said body, an elongated cylindrical pour spout extending axially from said throat, and a pour lip extending around an upper edge of said spout on a side of said spout remote from said handle, said pour lip comprising a part-cylindrical wall portion radially outwardly offset from said cylindrical pour spout, said container body with handle, finish wall, throat, pour spout and pour lip being integrally blow molded construction and of generally uniform wall thickness as formed, said pour spout having a planar upper edge that is non-perpendicular to the axis of said spout.

9. The container set forth in claim 8 wherein said inner diameter of said throat is machined on a cylinder of revolution concentric with said finish wall.

10. A closure and container package that comprises:
    a hollow body, a handle on a side of said body, a finish wall extending from said body with an external thread, a circular throat at an axial edge of said finish wall remote from said body and having a lesser inner diameter than said finish wall, a cylindrical pour spout extending from said throat coaxially with said throat and said finish wall at greater inner diameter than said throat, said pour spout terminating in a planar edge at an angle to the axis of said spout to form a pour opening, and a pour lip extending around an upper edge of said spout on a side of said spout remote from said handle, said pour lip comprising a part-cylindrical wall portion radially outwardly offset from said cylindrical pour spout, and
    a closure having a base wall, a peripheral outer skirt extending from said base wall and having an internal thread received over said external thread on said finish wall, and an inner cylindrical skirt extending from said base wall and spaced radially inwardly from said outer skirt in sliding plug-sealing receipt within said throat with said pour spout being disposed between said inner and outer skirts of said closure, said base wall being free of sealing contact with said upper edge of said spout.

11. The package set forth in claim 10 wherein said inner skirt has an outer surface with a radially outwardly extending bead for interference plug-sealing engagement with said throat.

* * * * *